Nov. 8, 1960    J. P. BOGATER ET AL    2,959,448
CLOSURE LATCH
Filed July 30, 1958    3 Sheets-Sheet 1

INVENTORS
John P. Bogater,
Bela Sandor, &
Alfonsas Velavicius
BY Herbert Furman
ATTORNEY

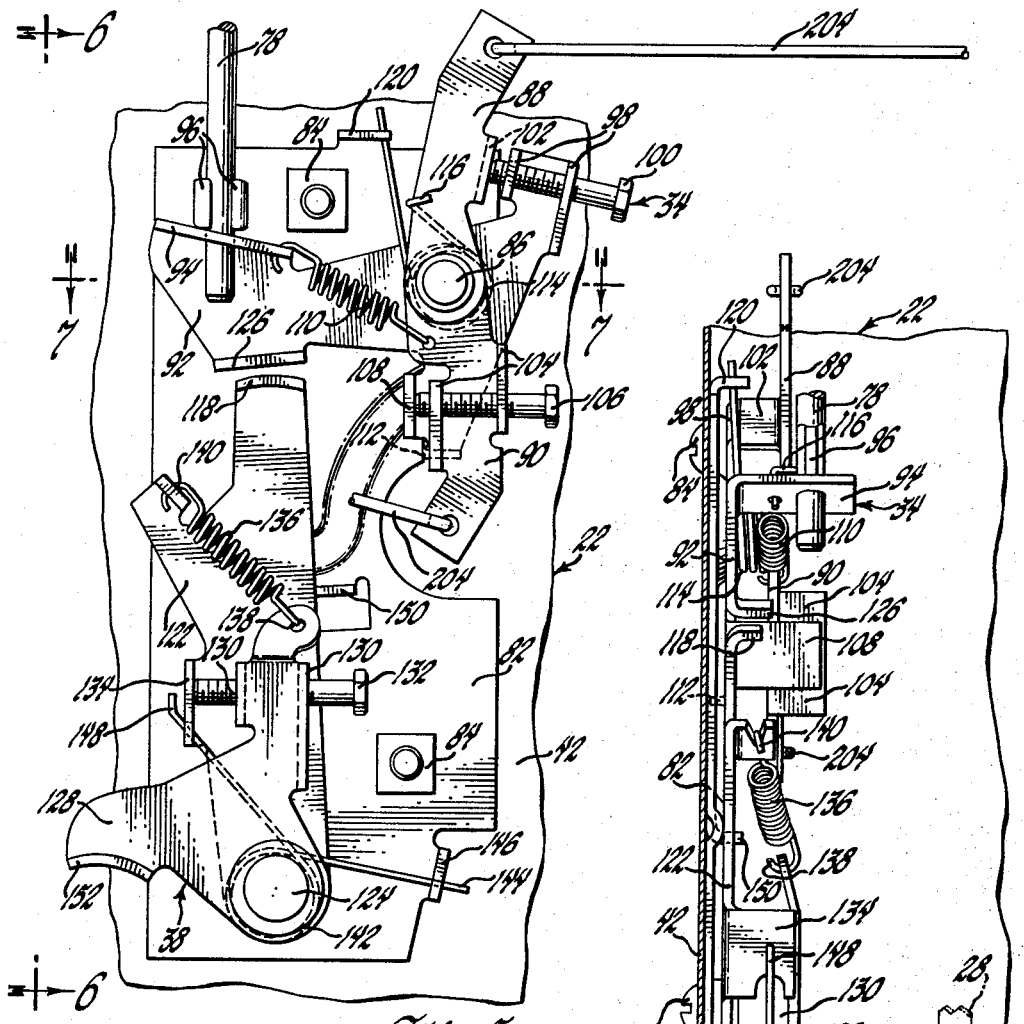

Nov. 8, 1960  J. P. BOGATER ET AL  2,959,448
CLOSURE LATCH
Filed July 30, 1958  3 Sheets-Sheet 3

INVENTORS
John P. Bogater,
Bela Sandor, &
Alfonsas Velavicius
BY
Herbert Furman
ATTORNEY United States Patent Office 2,959,448
Patented Nov. 8, 1960

2,959,448

CLOSURE LATCH

John P. Bogater, Bela Sandor, and Alfonsas Velavicius, Detroit, Mich., assignors to General Motors Corporation, Detroit, Mich., a corporation of Delaware Filed July 30, 1958, Ser. No. 751,939

6 Claims. (Cl. 296—106)

This invention relates to closure latches and more particularly to a latching arrangement for a vehicle body closure mounting a window movable to an open position within the closure and it is necessary that the window be in this open position before the closure is unlatched from the body for movement to an open position.

The closure latch of this invention is intended particularly for use with station wagon tail gates mounting a vertically movable window which is received within fixed guides on the body when the window is in a closed position, such as shown in the Hess et al. Patent 2,793,907. Since the window is received within fixed guides on the body when in closed position, the window must be moved to an open position within the tail gate before the tail gate is unlatched from the body for movement to an open position to effectively prevent damage to the window.

The closure latch of this invention generally includes a pair of side latches for latching the tail gate to the body and latch operating means including a manually operable handle for releasing the side latches to allow the tail gate to be moved to an open position. In order to insure that the window is in an open position within the tail gate before release of the side latches, the latch further includes blocking means which normally blocks release of the side latches but is movable to a non-blocking position by engagement with the window when the window is moved within the tail gate whereby the latch operating means may then be operated to release the side latches. Thus, any breaking or other damage to the window is effectively prevented since the position of the window controls operation of the latch operating means.

The primary object of this invention is to provide an improved closure latch for a vehicle body closure mounting a window wherein it is desired that the window be in a particular position with respect to the closure prior to any movement of the closure to an open position. Another object of this invention is to provide an improved closure latch for a vehicle body closure mounting a vertically movable window wherein it is desired that the window be in an open position within the closure prior to movement of the closure to an open position. A further object of this invention is to provide an improved closure latch for station wagon tail gate and window arrangements wherein it is desired that the window be in an open position within the tail gate prior to movement of the tail gate to an open position. Yet another object of this invention is to provide an improved vehicle body closure latch and operating means therefor.

These and other objects of this invention will be apparent from the following specification and drawings, wherein:

Figure 5 is an enlarged view of a portion of Figure 1;

Figure 6 is a view taken along the plane indicated generally by line 6—6 of Figure 5;

Figure 7 is a sectional view taken along the plane indicated generally by line 7—7 of Figure 5;

Figure 1:
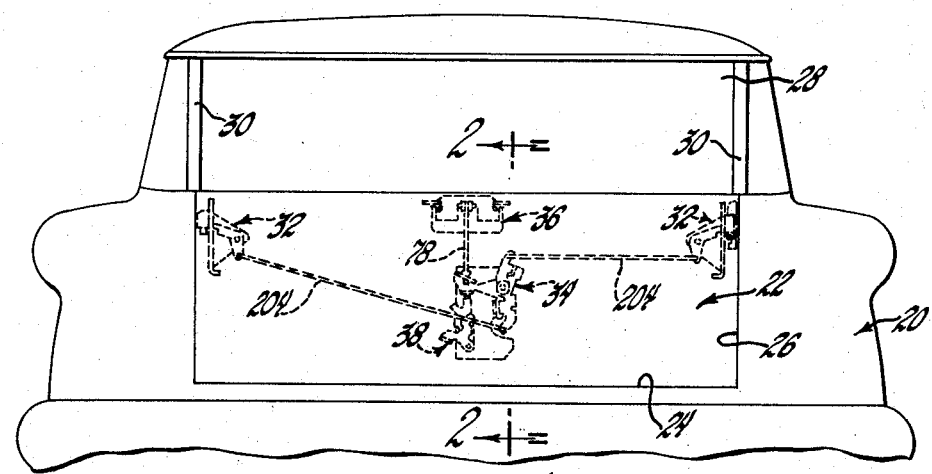
Figure 1 is a partial rear elevational view of a station wagon tail gate and window arrangement embodying a closure latch according to this invention.

Referring now particularly to Figure 1 of the drawings, a station wagon body 20 includes a tail gate 22 which is swingably mounted on the body at its lower edge 24 for movement between a closed position, as shown, and an open position, not shown, wherein the tail gate is disposed in a generally horizontal position with respect to the rear opening 26 of the body. The tail gate 22 mounts a window 28 which is movable vertically between a closed position, as shown, and an open position, not shown, wherein the window 28 is disposed within the tail gate 22. It will be understood, of course, that the window is mounted on the tail gate 22 for movement between its open and closed positions by a conventional window regulator mechanism, the details of which are not important to an understanding of this invention.

When the window 28 is in a closed position, the opposite side edges of the window are received within guide channels 30 which are fixed to the body 20 at the upper side edge portions of the opening 26 therein. Since the window 28 is received within fixed guides when in a closed position, the window must be in an open position within the tail gate before the tail gate is moved to an open position in order to prevent any damage or breaking of the window 28. This invention provides a latching arrangement operative to latch the tail gate 22 to the body and including means normally preventing unlatching of the tail gate from the body whenever the window 28 is in a closed or partially closed position. As shown in Figure 1 of the drawings, the latching arrangement generally includes a pair of like side latches 32 which are operative to latch the tail gate 22 to the body 20 and which are operated by latch operating means 34 including manual operating means 36. The latching arrangement further includes blocking means 38 which normally prevents operation of the operating means 34 unless the window 28 is in an open position within the tail gate 22.

Figure 2:
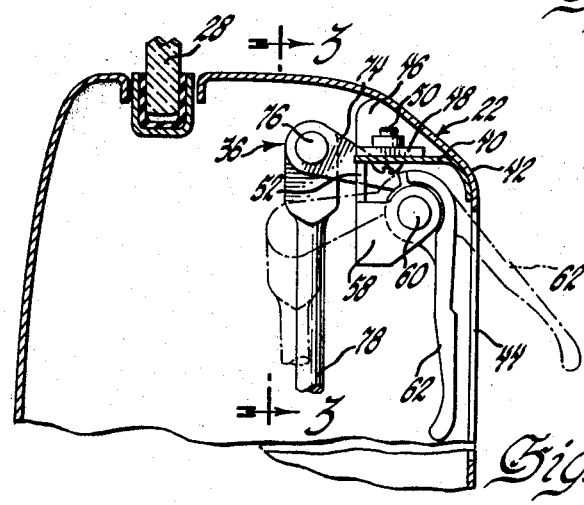
Figure 2 is an enlarged view taken along the plane indicated generally by line 2—2 of Figure 1.
Figure 4:
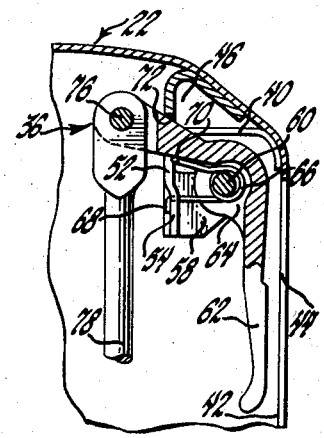
Figure 4 is a sectional view taken along the plane indicated generally by line 4—4 of Figure 3.
Figure 3:
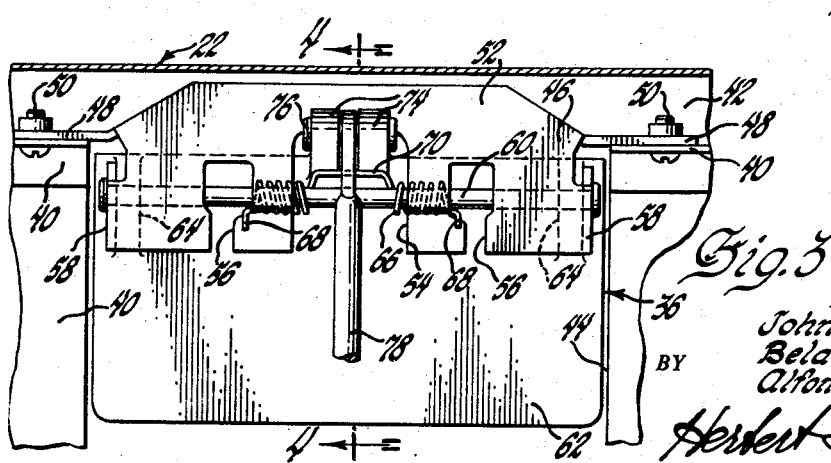
Figure 3 is a view taken along the plane indicated generally by line 3—3 of Figure 2.

Referring now particularly to Figures 2 through 4 of the drawings, the manual operating means 36 will first be described. A support bracket 40 is fixedly secured to the inner panel 42 of the tail gate 22 at each side of a generally rectangularly shaped opening 44 therein. A housing 46 extends between the brackets 40 and includes mounting flanges 48 which are bolted at 50 to brackets 40. The housing includes a depending inner wall 52 having a central slot 54 and slots 56 to either side thereof. The housing further includes a pair of laterally extending apertured flanges 58 and a shaft 60 extends between the flanges and is suitably secured thereto. A manually operable handle 62 includes a pair of laterally extending apertured flanges 64 which receive the shaft 60 and bear against each of the flanges 58 in order to swingably mount the handle 62 on the body adjacent the opening 44 and also to locate the handle with respect to the opening. A coil torsion spring 66 is mounted on the shaft 60, with each end 68 of the spring extending through a slot 56 into engagement with the inner wall 52 of the housing. An intermediate bight portion 70 of the spring engages the handle 62 to bias the handle in a clockwise direction, as viewed in Figure 4, to a non-operating position wherein the handle is located by engagement with the upper edge 72 of the central slot 54. Thus as shown in Figures 2 and 4 of the drawings, the handle 62 is normally located inwardly of the tail gate 22 and immediately adjacent and across the opening 44 so that a person can insert his hand within the opening and grasp the handle to swing the handle outwardly of the opening 44 to an operating position as shown in dot-dash lines in Figure 2.

Handle 62 further includes a pair of apertured ears 74 which fixedly mount a stud 76. The upper end of a vertically shiftable operating rod 78 is swingably mounted on the pin 76 and, as can be seen in Figure 2 of the drawings, when the handle 62 is swung outwardly of the opening 44 to its operating position as indicated in dot-dash lines, the rod 78 is shifted vertically downwardly within the tail gate 22. The rod 78 operates the latch operating means 34, and this will now be described with reference particularly to Figures 5 through 7 of the drawings.

A back plate 82 is bolted at 84 to the inner panel 42 of the tail gate 22. A stud 86 fixed to the back plate 82 swingably mounts a right hand and a left hand latch operating lever 88 and 90, respectively, and also an operating and adjusting lever 92. The lever 92 includes a laterally extending apertured flange 94 which slidably receives the lower end of the shiftable rod 78, with this rod being provided with a pair of wings 96 which engage the upper surface of the flange 94 whereby the lever 92 will be moved in a counterclockwise direction about stud 86, as viewed in Figure 5, upon vertically downward shifting movement of the rod 78. Lever 92 further includes a laterally extending pair of flanges 98 having threaded apertures which adjustably receive a bolt 100, with this bolt bearing against a laterally extending flange 102 of the right hand latch operating lever 88 to adjustably locate this lever in the desired position as will be further described. The left hand latch operating lever 90 includes a pair of laterally extending flanges 104 having threaded apertures which adjustably receive a bolt 106, with this bolt bearing against a lateral flange 108 of lever 92 to adjustably locate the latch operating lever 90, as will be further described. A tension spring 110 has one end thereof hooked through an aperture in flange 94 of lever 92 and the other end thereof hooked through an aperture in lever 90, as best shown in Figures 5 and 6 of the drawings in order to hold the bolt 106 in engagement with flange 108 and thereby adjustably locate lever 90 with respect to lever 92. Thus by adjusting the bolt 106 with respect to the flanges 104, the position of the lever 90 with respect to the lever 92 about the pin 86 may be adjusted. Lever 92 includes a laterally extending flange 112 which engages against the right hand side edge of the back plate 82 in order to locate the lever 92 in a clockwise direction about the stud 86. A coil torsion spring 114 is mounted on the stud 86 between the levers 88 and 90 and the lever 92, as best shown in Figure 7, with one end 116 of this spring being hooked over the lever 88 and the other end of the spring being received within a notched lateral flange 120 of plate 82. The spring 114 biases the lever 88 in a clockwise direction, as viewed in Figure 5, to hold the flange 102 of the lever against bolt 100 and in turn to bias the lever 92 in a clockwise direction to hold the flange 112 thereof in engagement with the right hand side edge of the plate 82.

Figure 8:
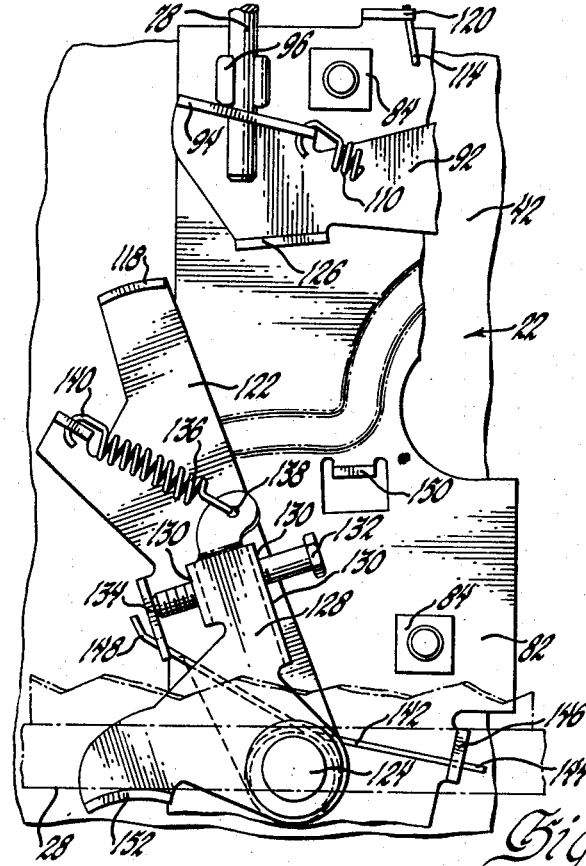
Figure 8 is a view of a portion of Figure 5 showing the blocking means in a non-blocking position.

As previously mentioned, the latching arrangement of this invention includes a blocking means 38, and this will now be described with reference particularly to Figures 5, 6 and 8 of the drawings. A blocking lever 122 is swingably mounted on a stud 124 which is fixed to the back plate 82. The blocking lever includes a lat-erally extending flange 118 which is normally positioned in a juxtaposed relationship to a similar flange 126 of the lever 92. An operating and adjusting lever 128 is also swingably mounted on the stud 124 and includes a pair of laterally extending flanges 130 having threaded apertures which adjustably receive a bolt 132. The bolt engages a lateral flange 134 of lever 122 and is held thereagainst by a tension spring 136 having one end thereof 138 hooked through an apertured ear of lever 128 and the other end 140 thereof hooked through a similar laterally extending apertured ear of lever 122. A coil torsion spring 142 is mounted on the stud 124, with one end 144 of the spring being received within a notched lateral flange 146 of the back plate 82 and the other end 148 thereof being received within a notch in the flange 134 of lever 122. The spring 142 biases the blocking lever 122 in a clockwise direction, as viewed in Figure 5, and normally holds the lever in engagement with a lateral flange 150 of the back plate 82 to locate the blocking lever 122 in its blocking position, as shown in Figure 5, wherein the flanges 118 and 126 of the levers 122 and 92, respectively, are normally located in juxtaposed relationship with respect to each other. The lever 128 further includes a laterally extending flange 152 which is engageable by the window 28 when the window is in an almost fully open position, as indicated schematically in Figure 6 of the drawings and as will be further described.

Figure 9:
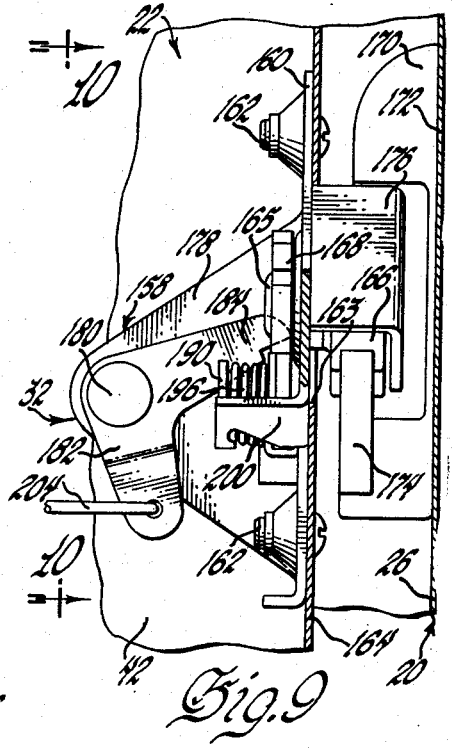
Figure 9 is an enlarged view of a portion of Figure 1.
Figure 10:
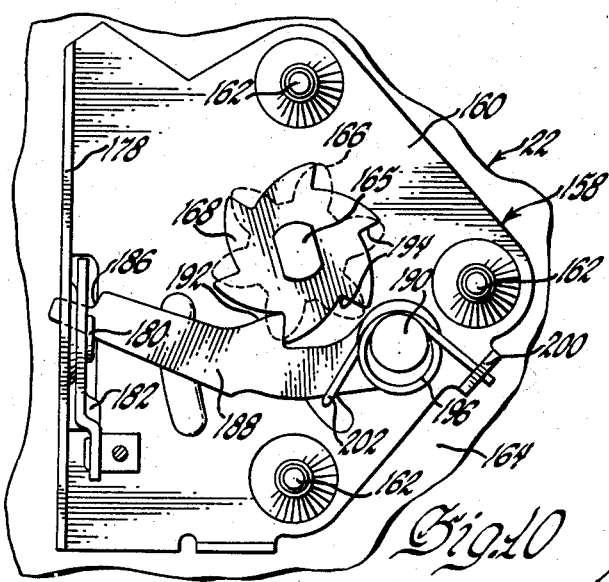
Figure 10 is a view taken along the plane indicated generally by line 10—10 of Figure 9.

Referring now particularly to Figures 9 and 10 of the drawings, the right hand side latch 32 will be described, and it will be understood that the left hand latch is of the same construction, although of different hand. An angle mounting plate 158 has one leg bolted at 162 to the side wall 164 of the tail gate 22 and fits over an opening 163 therein. The leg 160 rotatably supports a shaft 165. A gear type latch bolt 166 is fixed to this shaft to one side of the leg 160 and a detent star wheel 168 is fixed to the shaft to the other side of the leg 160. As best shown in Figure 9 of the drawings, the latch bolt 166 is positioned outwardly of the side wall 164 of the tail gate 22 and the detent wheel 168 is positioned inwardly of the tail gate 22.

A striker 170 is fixed to the jamb wall 172 of body 20 and includes a toothed striker member 174 which meshes with the bolt 166. The leg 160 further includes a latch bolt housing 176 which covers bolt 166 and is received within the striker 170 when the latch bolt meshes with member 174. The striker is of conventional construction.

The other leg 178 of plate 158 fixedly mounts a stud 180. A bell crank lever 182 pivotally mounted on the stud 180 has the notched end of one leg 184 thereof swinging in the path of the notched end 186 of a detent 188. The detent 188 is swingably mounted on a stud 190 fixed to leg 160 and includes a detent shoulder 192 engageable with any of the detent shoulders 194 of the detent wheel 168 to hold the latch bolt 166 in meshing engagement with the striker member 174. A coil torsion spring 196 is mounted on the stud 190, with one end of the spring being received within a notched lateral flange 200 of leg 160 and the other end 202 of the spring being hooked over the detent member 188 to bias the detent member toward detented position wherein the detent shoulder 192 of the member engages any of the detent shoulders 194 of the detent wheel 168. A connecting rod 204 has one end thereof hooked to the other apertured leg of bell crank 182, and the other end thereof hooked to the right hand latch operating lever 88, Fig. 5.

Disregarding for the moment the blocking lever 122 and the lever 128, it can be seen that upon movement of the handle 62 outwardly of the opening 44 to its dot-dash position, as shown in Figure 2, the rod 78 will be shifted downwardly within the tail gate 22 to swing the lever 92 counterclockwise about the stud 86 and in turn swing the levers 88 and 90 in the same direction about the same stud by reason of the engagement of the bolts 100 and 106 of the levers 92 and 90, respectively, with the levers 88 and 92, respectively. Upon movement of the levers 88 and 90 in this direction, the connecting rods 204 will be shifted toward the center of the tail gate the swing each of the bell cranks 182 clockwise, as viewed in Figures 1 and 9, and thereby swing the detent members 188 counterclockise about the studs 190 to permit opening movement of the tail gate 22.

As can be seen from Figure 5 of the drawings, counterclockwise movement of the lever 92 is normally prevented by the juxtaposed relationship of the flanges 118 and 126 of the blocking lever 122 and the lever 92, respectively. Thus normally the tail gate cannot be moved to an open position since the side latches 32 cannot be operated.

It will be remembered that the window 28 is received within the fixed guides 30 on the body when the window is in a closed position whereby it is necessary that the window be moved to an open position before the tail gate is moved to an open position to prevent damage to the window. Upon movement of the window 28 to an almost fully open position within the tail gate 22, the lower edge of the window 28 will engage the flange 152 of lever 128, as shown in Figure 6. When the window engages the flange 152, and thereafter continues its movement to a fully open position, the lever 128 will be swung counterclockwise, as viewed in Figure 5, to in turn swing the blocking lever 122 in the same direction about the stud 124 and thereby move the flange 124 of the blocking lever out of juxtaposition to the flange 126, as shown in Figure 8, whereby the tail gate may thereafter be moved to an open position upon operation of the manual operating means 36 and the latch operating means 34 to release the side latches 32.

Thus, as long as the window 28 is in an open position, the tail gate 22 may be moved between its open and closed positions at the will of the operator. However, should the window 28 be moved to a closed position or to any partially closed position wherein any portions of the side edges of the window are received within the fixed guides 30, the lower edge of the window will be moved upwardly with respect to the flange 152 of lever 128 to allow the spring 142 to return this lever and the blocking lever 122 to the blocking position of the latter, as shown in Figures 5 and 6 of the drawings.

Thus this invention provides an improved latching arrangement for a vehicle, closure and window arrangement wherein it is desired that the window be moved to an open position within the closure prior to movement of the closure to an open position. Although the invention is particularly intended for use with station wagon tail gate and window arrangements wherein the window is received within fixed guides on the body when in closed position, it will be appreciated that the invention may have other uses wherein similar conditions may arise.

What is claimed is:

1. The combination comprising, a vehicle body, a closure mounted on said body for movement to open and closed positions, a window mounted on said closure for movement between fully open and closed positions, latch means for latching said closure to said body, latch operating means operatively connected to said latch means to effect release thereof and allow said closure to be moved to open position, blocking means normally blocking operation of said operating means when said window is in any position other than a fully open position, and means on said blocking means engageable by said window upon movement thereof to said fully open position for moving said blocking means to a non-blocking position to allow operation of said operating means.

2. The combination comprising, a vehicle body, a closure mounted on said body for movement to open and closed positions, a window mounted on said closure for movement between fully open and closed positions, latch means for latching said closure to said body, latch operating means mounted within said closure, means operatively connecting said operating means to said latch means to release said latch means and allow said closure to be moved to open position, manually operable means for operating said latch operating means, blocking means normally blocking operation of said operating means when said window is in any position other than a fully open position, and means on said blocking means engageable by said window upon movement thereof to said fully open position for moving said blocking means to a non-blocking position to allow operation of said operating means by said manually operable means.

3. The combination comprising, a vehicle body, a closure mounted on said body for movement to open and closed positions, a window mounted on said closure for movement between fully open and closed positions, latch means for latching said closure to said body, latch operating means mounted within said closure and including operating lever means, means operatively connecting said operating means to said latch means to release said latch means and allow said closure to be moved to open position, manually operable means for operating said latch operating means, blocking lever means normally blocking operation of said operating lever means when said window is in any position other than a fully open position, and means on said blocking lever means engageable by said window upon movement thereof to said fully open position for moving said blocking lever means to a non-blocking position to allow operation of said operating lever means by said manually operable means.

4. The combination comprising, a vehicle body, a closure mounted on said body for movement to open and closed positions, a window mounted on said closure for movement between fully open and closed positions, latch means for latching said closure to said body, a latch operating lever swingably mounted within said closure, means operatively connecting said lever to said latch means to effect release thereof and allow said closure to be moved to open position, a blocking lever swingably mounted within said closure, resilient means normally biasing said blocking lever to blocking position, means on each of said levers normally located in juxtaposed relationship when said blocking lever is in blocking position to block swinging movement of said operating lever when said window is in any position other than a fully open position, and means on said blocking lever engageable by said window upon movement thereof to said fully open position for swinging said blocking lever to a non-blocking position against the action of said resilient means to allow swinging movement of said operating lever.

5. The combination comprising, a vehicle body, a closure mounted on said body for movement to open and closed positions, a window mounted on said closure for movement between fully open and closed positions, latch means for latching said closure to said body, an operating lever swingably mounted within said closure, means operatively connecting said lever to said latch means to effect release thereof and allow said closure to be moved to open position, a manually operable handle swingably mounted on said closure, a shiftable rod pivotally connected to said handle and engageable with said operating lever to swing said operating lever upon movement of said handle, a blocking lever swingably mounted within said closure, means on each of said levers normally located in juxtaposed relationship to thereby normally block movement of said operating lever when said window is in any position other than a fully open position, and means on said blocking lever engageable by said window upon movement thereof to said fully open position for swinging said blocking lever to a non-blocking position and thereby allow swinging movement of said operating lever by said manually operable handle.

6. The combination comprising, a vehicle body, a closure mounted on said body for movement to open and closed positions, a window mounted on said closure for movement between fully open and closed positions, spaced latch means for latching said closure to said body, an operating lever swingably mounted within said closure and including a laterally extending flange, a pair of latch operating levers coaxially mounted with said operating lever, means adjustably interconnecting each of said latch operating levers with said operating lever for swinging movement of the former upon swinging movement of the latter, means operatively connecting said latch operating levers to said means to effect release thereof and allow said closure to be moved to open position, a manually operable handle swingable mounted on said closure, a shiftable rod interconnecting said handle and said operating lever, a blocking lever swingably mounted within said closure and including a lateral flange, means resiliently biasing said blocking lever to a blocking position to locate the flange thereof in juxtaposed relationship to the flange of said operating lever and thereby normally block movement of said operating lever when said window is in any position other than a fully open position, and means adjustably secured to said blocking lever and including a lateral flange engageable by said window upon movement thereof to said fully open position to swing said blocking lever to a non-blocking position and move the flange thereof out of juxtaposed relationship to said operating lever flange to allow swinging movement of said operating lever.

References Cited in the file of this patent

UNITED STATES PATENTS

| | | |
|---|---|---|
| 2,104,639 | Dall | Jan. 4, 1938 |
| 2,105,830 | Aiken | Jan. 18, 1938 |
| 2,249,932 | Beal | July 22, 1941 |
| 2,326,456 | Gouin | Aug. 10, 1943 |
| 2,378,500 | Rappl | June 19, 1945 |
| 2,707,127 | Parsons | Apr. 26, 1955 |
| 2,754,143 | Huehnel | July 10, 1956 |